(12) United States Patent
Weh et al.

(10) Patent No.: US 11,767,835 B2
(45) Date of Patent: Sep. 26, 2023

(54) PISTON PUMP HAVING A HELICAL GEAR AS A POWER BRAKE PRESSURE GENERATOR OF A HYDRAULIC VEHICLE POWER BRAKE SYSTEM

(71) Applicant: Robert Bosch GmbH, Stuttgart (DE)

(72) Inventors: Andreas Weh, Sulzberg (DE); Martin Winkler, Sonthofen (DE); Martin Hagspiel, Rettenberg (DE); Matthias Mayr, Rettenberg (DE); Stefan Kaserer, Ofterschwang (DE)

(73) Assignee: ROBERT BOSCH GMBH, Stuttgart (DE)

( * ) Notice: Subject to any disclaimer, the term of this patent is extended or adjusted under 35 U.S.C. 154(b) by 104 days.

(21) Appl. No.: 17/445,433

(22) Filed: Aug. 19, 2021

(65) Prior Publication Data
US 2022/0112888 A1 Apr. 14, 2022

(30) Foreign Application Priority Data

Oct. 14, 2020 (DE) .......................... 102020212989.4

(51) Int. Cl.
*B60T 13/16* (2006.01)
*F04B 17/00* (2006.01)
*F04B 23/00* (2006.01)
*B60T 17/02* (2006.01)

(52) U.S. Cl.
CPC ............ *F04B 17/00* (2013.01); *B60T 13/168* (2013.01); *B60T 17/02* (2013.01); *F04B 23/00* (2013.01)

(58) Field of Classification Search
CPC ........ F04B 17/03; B60T 17/02; B60T 13/745; F15B 7/00
See application file for complete search history.

(56) References Cited

U.S. PATENT DOCUMENTS

2019/0017502 A1* 1/2019 Ohm ....................... F16H 25/20

FOREIGN PATENT DOCUMENTS

DE 102014212409 A1 12/2015
DE 102015225712 A1 * 6/2017

* cited by examiner

*Primary Examiner* — Abiy Teka
(74) *Attorney, Agent, or Firm* — NORTON ROSE FULBRIGHT US LLP; Gerard Messina

(57) ABSTRACT

A nut of a helical gear of a piston pump of a hydraulic vehicle power brake system. The nut has a plastic body that is covered by a metal sleeve. The plastic body has a through hole having a nut thread.

16 Claims, 2 Drawing Sheets

PISTON PUMP HAVING A HELICAL GEAR AS A POWER BRAKE PRESSURE GENERATOR OF A HYDRAULIC VEHICLE POWER BRAKE SYSTEM

CROSS REFERENCE

The present application claims the benefit under 35 U.S.C. § 119 of German Patent Application No. DE 102020212989.4 filed on Oct. 14, 2020, which is expressly incorporated herein by reference in its entirety.

FIELD

The present invention relates to a piston pump having a helical gear as a power brake pressure generator of a hydraulic vehicle power brake system and to a hydraulic block including the piston pump.

BACKGROUND INFORMATION

German Patent Application No. DE 10 2014 212 409 A1 describes a power brake pressure generator for a hydraulic vehicle power brake system including a hydraulic block, in which a blind hole is fashioned as a cylinder hole or as a cylinder of a piston pump. For generating a brake pressure, a torsionally fixed hollow piston is axially displaceable into the cylinder by a helical gear. The helical gear of the conventional power brake pressure generator is a ball-screw drive, whose spindle is situated in one piece with, and coaxially within, the hollow piston. A nut of the ball-screw drive protrudes coaxially from the hollow piston and is rotatably supported outside of the hollow piston by a spindle bearing in a tubular bearing support, which is fastened on the hydraulic block coaxially to the cylinder. The rotary drive of the nut is provided by an electric hollow shaft motor coaxially enclosing the bearing support via a planetary gear as a mechanical reduction gear.

SUMMARY

A piston pump according to an example embodiment of the present invention comprises a piston displaceable in a cylinder and a helical gear for displacing the piston in the cylinder. The helical gear comprises a spindle and a nut, whose respective threads mesh with each other directly or indirectly, for example via revolving balls, so that a rotary drive of the nut axially displaces the spindle or conversely a rotary drive of the spindle axially displaces the nut. The axially displaceable part of the helical gear, that is, the spindle or the nut, is connected to the piston, so that a rotary drive of the other part of the helical gear, that is, the nut or the spindle, displaces the piston axially in the cylinder of the piston pump.

For an inexpensive producibility of the nut of the helical gear, an example embodiment of the present invention provides for the nut to be produced partially from plastic. The nut has a, for example, cylinder tube-shaped plastic body having a nut thread, which meshes directly or indirectly with a screw thread of the spindle of the helical gear. For sufficient mechanical strength of the nut, the present invention provides for a metal sleeve, which covers the plastic body and protects it especially against radial expansion. To "cover" means in particular that the metal sleeve encloses the plastic body at the circumference without interstitial space in order to brace it against radial expansion.

Further developments and advantageous embodiments of the present invention are disclosed herein.

According to an example embodiment of the present invention, a hydraulic block is provided for a hydraulic unit of a hydraulic vehicle power brake system, which comprises the cylinder of the piston pump of the present invention for example in the form of a blind hole or through hole forming a cylinder hole.

All of the features disclosed in the description and in the figures may be realized individually by themselves or in fundamentally any combination in specific embodiments of the present invention. Embodiments of the present invention, which do not include all, but only one or multiple features of a specific embodiment of the present invention, are possible.

BRIEF DESCRIPTION OF THE DRAWINGS

The present invention is explained in greater detail below on the basis of a specific embodiment illustrated in the figures.

DETAILED DESCRIPTION OF EXAMPLE EMBODIMENTS

Figure 1:
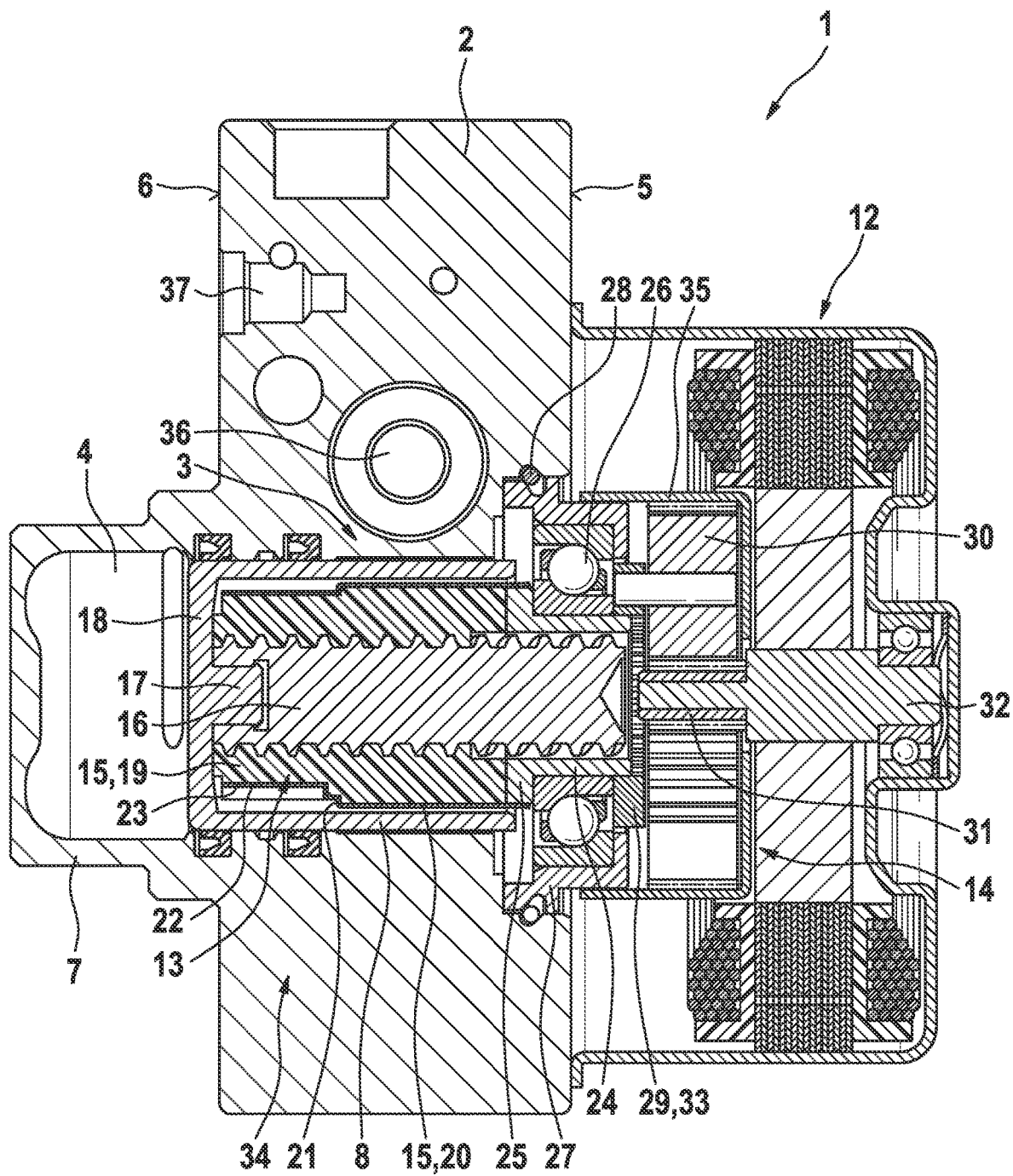
FIG. 1 shows a sectional view of a hydraulic unit including a piston pump according to an example embodiment of the present invention.
Figure 2:
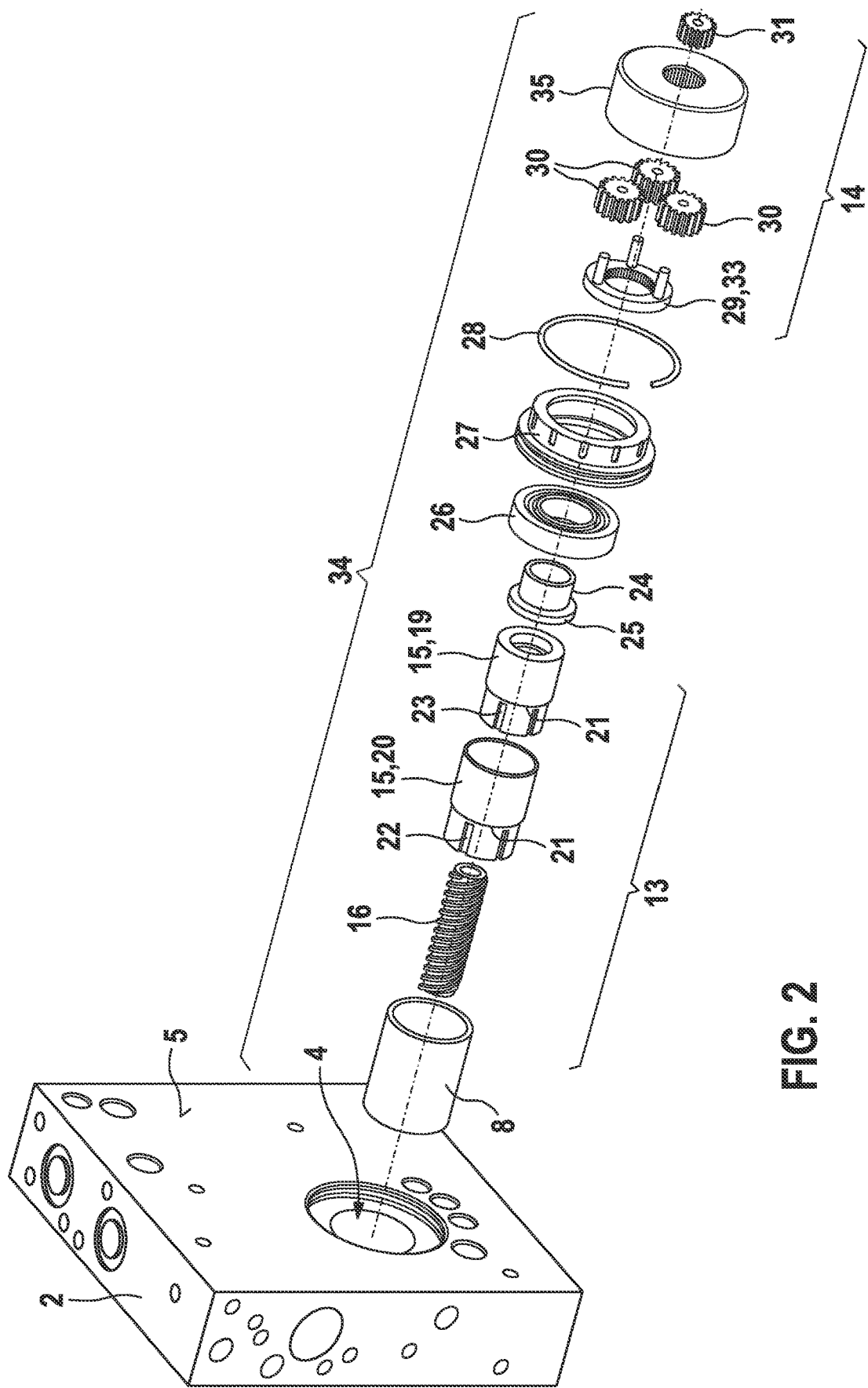
FIG. 2 shows the hydraulic unit including the piston pump from FIG. 1 in a perspective exploded view.

The hydraulic unit 1 shown in the the figures is used to generate a brake pressure in a slip-controlled hydraulic vehicle power brake system. Slip-control systems are for example antilock systems, acceleration slip regulation systems and/or vehicle dynamics control system/electronic stability programs, for which the abbreviations ALS, ASR and/or VDC/ESP are commonly used.

Hydraulic unit 1 has a hydraulic block 2 according to the present invention, which is used for mechanically mounting and hydraulically interconnecting hydraulic and other components of the slip control system such as solenoid valves, non-return valves, hydraulic accumulators and damping chambers. The components are situated on and in hydraulic block 2 and are hydraulically connected to one another by a system of bore holes in hydraulic block 2, which are not visible in the drawing, in accordance with a hydraulic circuit layout of the vehicle power brake system and the slip control system.

In the illustrated and described specific embodiment of the present invention, hydraulic block 2 is a flat metal block in the shape of a rectangular cuboid, made out of an aluminum alloy for example, which is provided with bore holes for accommodating the components and has a system of bore holes in accordance with a hydraulic circuit layout of the vehicle power brake system and the slip control system. Furthermore, a piston pump 3 according to the present invention is accommodated on and in hydraulic block 2 for generating the brake pressure using a power source.

Hydraulic block 2 has a blind hole as a cylinder 4 of piston pump 3, which is mounted in hydraulic block 2 perpendicularly to two large, mutually opposite sides of hydraulic block 2. Cylinder 4 is open on one of the two large sides of hydraulic block 2, which is designated here as motor side 5. The opposite large side of hydraulic block 2 is referred to here as valve side 6. On valve side 6, hydraulic block 2 in the exemplary embodiment has a cup-shaped, hollow cylindrical formation 7, which axially extends cylinder 4. Cylinder 4 accommodates a piston 8 of piston pump 3 in an axially displaceable manner, which in the exemplary embodiment is a cylinder tube-shaped hollow piston having one open end and one closed end.

In order to displace piston 8 in cylinder 4, hydraulic unit 1 has an electric motor 12 as a drive motor, a helical gear 13 and a planetary gear 14 as a mechanical reduction gear. Electric motor 12 is mounted coaxially to cylinder 4 outside on motor side 5 of hydraulic block 2. Planetary gear 14 and helical gear 13 are situated coaxially to electric motor 12 and to cylinder 4 between electric motor 12 and piston 8. Helical gear 13 is located partially or entirely in piston 8, embodied as a hollow piston, and otherwise protrudes from the open end of piston 8 facing electric motor 12.

Helical gear 13 has a nut 15, which electric motor 12 is able to drive in a rotating manner via planetary gear 14, and an axially displaceable spindle 16, whose screw thread meshes with a nut thread of nut 15, so that spindle 16 of helical gear 13 is displaced axially in cylinder 4 in hydraulic block 2 by a rotation of nut 15.

For the connection to spindle 16, piston 8, embodied as a hollow piston, has a head tenon 17 on an inner side of a piston bottom 18, onto which the spindle 16 of helical gear 12 is snapped, which for this purpose has a corresponding blind hole having a circumferential radial groove in its one end face.

According to the present invention, nut 15 of helical gear 13 of piston pump 3 is made up of several parts, comprising in the exemplary embodiment a cylindrical plastic body 19 having an axial through hole, which has the nut thread of nut 15. Plastic body 19 is covered by a cylinder tube-shaped metal sleeve 20, which is pressed or shrink-fitted onto plastic body 19. Metal sleeve 20 braces plastic body 19 from outside against a radial expansion.

Metal sleeve 20 and plastic body 19 have corresponding adjacent ring steps 21, by which metal sleeve 20 is in one direction axially firmly connected to plastic body 19 by a form-locking connection. Ring steps 21 are designed in such a way that the form-locking connection exists during a brake pressure-generating forward stroke of piston 8 into cylinder 4. In a return stroke of piston 8 in the opposite direction, a friction-locking connection between metal sleeve 20 and plastic body 19 suffices to retain them in an axially firm connection to each other.

For a rotatably fixed connection between metal sleeve 20 and plastic body 19 of nut 15 of helical gear 13, metal sleeve 20 has axially parallel inward corrugations 22, which engage with axially parallel grooves 23 in a circumference of plastic body 19. Corrugations 22 may also be understood as inward projections from metal sleeve 20 and grooves 23 may be understood as recesses in the circumference of plastic body 19.

For a rotational bearing and axial support of nut 15, a multifunction part 24 is pressed into one end of metal sleeve 20 and welded to metal sleeve 20. Multifunction part 24 is cylinder tube-shaped and has a flange 25 on one end, which is pressed into the end of metal sleeve 20 and is welded to it. Flange 25 of multifunction part 24 abuts against an end face of plastic body 19 of nut 15, whereby a large-area contact of plastic body 19 on multifunction part 24 is achieved, in order to transmit a high axial force for generating the brake pressure with low mechanical compressive stress in plastic body 19 from multifunction part 24 onto plastic body 19. This makes it possible to develop plastic body 19 of nut 15 from plastic. In the exemplary embodiment, multifunction part 24 is made of metal, in particular of steel.

In the exemplary embodiment, nut 15 has an outside diameter of 33 mm and must transmit an axial force for generating a hydraulic pressure of up to approximately 200 bar. Multifunction part 24 including flange 25, which transmits the axial force via a large area onto plastic body 19 of nut 15 and consequently keeps the mechanical compressive stress in plastic body 19 comparably low, makes it possible to use plastic for plastic body 19, which forms a central component of nut 15. The same applies to metal sleeve 20, which encloses plastic body 19 in the manner of a socket and thereby ensures the thread engagement with spindle 16 even in the case of a high axial force, without the nut thread of plastic body 19 being able to disengage from a screw thread of spindle 16 by axial expansion.

There are also other possibilities for connecting multifunction part 24 to nut 15, it being possible for example for metal sleeve 20 to be curled, that is, to be deformed inward, on a side of flange 25 of multifunction part 24 facing away from plastic body 19. The connection must in particular introduce a torque from a yet to be explained gear output element 33 of a reduction gear for a rotary drive of nut 15 via multifunction part 24 into nut 15. Multifunction part 24 transmits axial pressure via the contact of its flange 25 on plastic body 19 of nut 15, and a tensile stress is low, which is why a tensile load capacity of the connection of multifunction part 24 to nut 15 may be low.

A cylinder tube-shaped section of multifunction part 24 protrudes coaxially from metal sleeve 20 and from piston 8, embodied as a hollow piston, of piston pump 3. A ball bearing is pressed onto the cylinder tube-shaped section of multifunction part 24 as spindle bearing 26, which rotatably supports nut 15. Multifunction part 24 or its cylinder tube-shaped section forms a bearing support for spindle bearing 26.

Spindle bearing 26 is pressed into an annular bearing support 27, which is pressed into a ring step at an opening of cylinder 4 in hydraulic block 2 and is secured by a spring lock washer 28, which engages into a circumferential groove outside in bearing support 27 and into a circumferential groove inside in a circumferential wall of the ring step at the opening of cylinder 4.

On a side of spindle bearing 26 facing away from flange 25, an apertured disk-shaped planet carrier 29 is pressed onto the cylinder tube-shaped section of multifunction part 24. To ensure a rotatably fixed connection between planet carrier 29 and multifunction part 24 and thus with nut 15 of helical gear 13, an edge of a central hole of planet carrier 29 has toothing, which when pressing planet carrier 29 onto the cylinder tube-shaped section of multifunction part 24 molds into the cylinder tube-shaped section.

Cylindrical pins—three in the exemplary embodiment—extend coaxially from planet carrier 29 as shafts for planet wheels 30 of planetary gear 14, on which planet wheels 30 are rotatably situated. A sun wheel 31 of planetary gear 14, which is situated between planet wheels 30 and which meshes with planet wheels 30, is pressed onto a motor shaft 32 of electric motor 12.

On the outside, planet wheels 30 mesh with an inner toothing of a ring gear 35 of planetary gear 14, which is pressed onto the annular bearing support 27.

Planet carrier 29 forms a gear output element 33 of the planetary gear 14 forming the reduction gear. Multifunction part 24 or its cylinder tube-shaped section forms a support for gear output element 33 in addition to the bearing support for spindle bearing 26. In the exemplary embodiment, the planet carrier 29 forming the gear output element 33 of planetary gear 14 rests via an inner ring of spindle bearing 26 and flange 25 of multifunction part 24 on plastic body 19 of nut 15. In the return stroke of piston 8, planet carrier 29 is consequently axially supported and does not have to be supported axially by spindle bearing 26. This allows for the use of a cost-effective angular ball bearing as spindle bearing 26 for nut 15 of helical gear 13. The present invention, however, is not limited to an angular ball bearing as spindle bearing 26.

In the exemplary embodiment, multifunction part 24 forms the bearing support for spindle bearing 26 of nut 15 of helical gear 13; it supports nut 15 axially; it transmits an axial force over a large surface onto plastic body 19 of nut 15 via its flange 25; with its flange 25, it axially supports planet carrier 29, forming the gear output element 33, of planetary gear 14 via the inner ring of spindle bearing 26; and transmits a torque from planet carrier 29, forming gear output element 33, onto nut 15. A multifunction part 24 not having all or having other functions than the listed functions is likewise possible, as is a multifunction part 24 having further functions.

Electric motor 12, planetary gear 14, helical gear 13 and piston pump 3 form a power brake pressure generator 34 for the hydraulic slip-controlled vehicle power brake system.

In the illustrated and described specific embodiment of the present invention, hydraulic block 2 has a master brake cylinder bore 36, in which a master brake cylinder piston may be situated (not shown), which is mechanically displaceable in master brake cylinder bore 36 via a piston rod using a foot brake pedal or a hand brake lever (not shown).

Diameter-stepped blind holes are formed in valve side 6 of hydraulic block 2 as receptacles 37 for solenoid valves (not shown). The solenoid valves are components of the slip-control system and a brake pressure control system, which control the brake pressure or the wheel brake pressures in the wheel brakes. Equipped with the components of the slip-control system, hydraulic block 2 forms hydraulic unit 1.

In place of the single-stage planetary gear 14, hydraulic unit 1 may also have a multi-stage planetary gear or another reduction gear such as a cycloidal drive, for example (not shown).

What is claimed is:

1. A piston pump, comprising:
   a helical gear as a power brake pressure generator of a hydraulic vehicle power brake system;
   a piston displaceable in a cylinder, wherein:
   the helical gear includes a spindle that is connected to the piston or is rotationally drivable and a nut that is rotationally drivable or connected to the piston for displacing the piston in the cylinder for generating a hydraulic brake pressure; the nut includes:
   a plastic body with a nut thread; and
   a metal sleeve covering the plastic body; and
   the piston pump includes at least one of the following features (a)-(g):
   (a) the plastic body and the metal sleeve are each tubular and are form-fitted to each other;
   (b) the metal sleeve is arranged relative to the plastic body such that the plastic body is prevented from radially expanding due to impingement of the plastic body against the metal sleeve;
   (c) the metal sleeve is arranged at a radial position that is between a radial position of the plastic body and a radial position of the piston;
   (d) the metal sleeve encloses the plastic body at a circumference of the plastic body without any space between the plastic body and the metal sleeve;
   (e) the metal sleeve includes an inward corrugation inserted in a groove of the plastic body of the nut
   (f) the plastic body of the nut has a rib inserted in an outward corrugation of the metal sleeve; and
   (g) the metal sleeve and the plastic body of the nut have corresponding ring steps for an axially fixed connection between the metal sleeve and the plastic body of the nut in a direction of the pressure-generating forward stroke of the piston.

2. The piston pump as recited in claim 1, wherein the metal sleeve is arranged relative to the plastic body of the nut such that the plastic body is prevented from radially expanding due to impingement of the plastic body against the metal sleeve.

3. The piston pump as recited in claim 1, wherein the metal sleeve is rotatably fixed and/or axially fixed, at least in the direction of the pressure-generating forward stroke of the piston, to the plastic body of the nut.

4. The piston pump as recited in claim 3, wherein, to rotatably fix the metal sleeve to the plastic body of the nut: (i) the metal sleeve includes the inward corrugation, inserted in the groove of the plastic body of the nut, and/or (ii) the plastic body of the nut has the rib inserted in the outward corrugation of the metal sleeve.

5. The piston pump as recited in claim 1, wherein the metal sleeve and the plastic body of the nut have the corresponding ring steps for the axially fixed connection between the metal sleeve and the plastic body of the nut in the direction of the pressure-generating forward stroke of the piston.

6. The piston pump as recited in claim 1, wherein the metal sleeve includes a multifunction part, which forms a bearing support for a spindle bearing for the nut of the helical gear and a carrier for a gear output element of a reduction gear for a rotational drive of the nut.

7. The piston pump as recited in claim 6, wherein the multifunction part is pressed into the metal sleeve and/or is integrally joined with the metal sleeve.

8. The piston pump as recited in claim 6, wherein the multifunction part axially supports the plastic body of the nut and/or the spindle bearing of the nut.

9. The piston pump as recited in claim 6, wherein the reduction gear is a planetary gear whose planet carrier is connected to the multifunction part in a rotatably fixed manner pressed onto the multifunction part.

10. The piston pump as recited in claim 1, wherein the piston is a hollow piston and the helical gear is situated at least partially in the hollow piston.

11. The piston pump as recited in claim 1, wherein the plastic body and the metal sleeve are each tubular and are form-fitted to each other.

12. The piston pump as recited in claim 1, wherein the metal sleeve is arranged at the radial position that is between the radial position of the plastic body and the radial position of the piston.

13. The piston pump as recited in claim 1, wherein the metal sleeve encloses the plastic body at the circumference of the plastic body without any space between the plastic body and the metal sleeve.

14. The piston pump as recited in claim 1, wherein the metal sleeve includes the inward corrugation inserted in the groove of the plastic body of the nut.

15. The piston pump as recited in claim 1, wherein the plastic body of the nut has the rib inserted in the outward corrugation of the metal sleeve.

16. A hydraulic block for a hydraulic unit of an hydraulic vehicle power brake system, comprising:
- a helical gear as a power brake pressure generator of a hydraulic vehicle power brake system;
- a piston displaceable in a cylinder, wherein:
  - the helical gear includes a spindle that is connected to the piston or is rotationally drivable and a nut that is rotationally drivable or connected to the piston for displacing the piston in the cylinder for generating a hydraulic brake pressure;
  - the nut includes:
    - a plastic body with a nut threat and
    - a metal sleeve covering the plastic body;
  - the helical gear is situated coaxially to the cylinder and is supported rotatably with a spindle bearing on the hydraulic block, which supports the helical gear axially on the hydraulic block; and
  - the hydraulic block includes at least one of the following features (a)-(g):
    - (a) the plastic body and the metal sleeve are each tubular and are form-fitted to each other;
    - (b) the metal sleeve is arranged relative to the plastic body such that the plastic body is prevented from radially expanding due to impingement of the plastic body against the metal sleeve;
    - (c) the metal sleeve is arranged at a radial position that is between a radial position of the plastic body and a radial position of the piston;
    - (d) the metal sleeve encloses the plastic body at a circumference of the plastic body without any space between the plastic body and the metal sleeve;
    - (e) the metal sleeve includes an inward corrugation inserted in a groove of the plastic body of the nut
    - (f) the plastic body of the nut has a rib inserted in an outward corrugation of the metal sleeve; and
    - (g) the metal sleeve and the plastic body of the nut have corresponding ring steps for an axially fixed connection between the metal sleeve and the plastic body of the nut in a direction of the pressure-generating forward stroke of the piston.

* * * * *